United States Patent [19]

Nishida et al.

[11] Patent Number: 5,286,844
[45] Date of Patent: Feb. 15, 1994

[54] METHOD OF PURIFYING POLYACRYLONITRILE

[75] Inventors: Kozi Nishida; Yukio Kasabo; Toshihiro Maxima; Yoshio Manabe, all of Otake; Osamu Kato, Toyama, all of Japan

[73] Assignee: Mitsubishi Rayon Co., Ltd., Tokyo, Japan

[21] Appl. No.: 979,269

[22] Filed: Nov. 20, 1992

[30] Foreign Application Priority Data

Nov. 22, 1991 [JP] Japan ............... 03-307911
Dec. 9, 1991 [JP] Japan ............... 03-350330

[51] Int. Cl.$^5$ ............... C08F 6/08
[52] U.S. Cl. ............... 528/482; 8/115.54
[58] Field of Search ............... 528/482

[56] References Cited

U.S. PATENT DOCUMENTS 3,395,133 7/1968 D'Alelio ............... 528/482
4,636,540 1/1987 Warfel ............... 528/482

FOREIGN PATENT DOCUMENTS 0408363 1/1991 European Pat. Off.

OTHER PUBLICATIONS

Database WPIL, AN-82-18835E, & JP-A-57 019066, February 1, 1982.
Database WPIL, AN-86-134813, & JP-A-61 072010, April 14, 1986.

Primary Examiner—Joseph L. Schofer
Assistant Examiner—Tom Weber
Attorney, Agent, or Firm—Oblon, Spivak, McClelland, Maier & Neustadt

[57] ABSTRACT

There are disclosed a method of purifying a polyacrylonitrile which comprises removing iron compounds or ions thereof and aluminum compounds or ions thereof which can be contained as impurities in a polyacrylonitrile obtained by aqueous suspension polymerization using an inorganic redox initiator, from a solution consisting of said polyacrylonitrile and an organic solvent capable of dissolving said polyacrylonitrile, by the use of a substance having ion-exchanging ability which is insoluble in said organic solvent; a process for producing fiber from the polyacrylonitrile thus purified; and a process for producing carbon fiber from said fiber.

4 Claims, No Drawings

METHOD OF PURIFYING POLYACRYLONITRILE

BACKGROUND OF THE INVENTION

1. Field of the Invention

The present invention relates to a method of purifying a polyacrylonitrile obtained by aqueous suspension polymerization by the use of an inorganic redox initiator; a process for producing acrylic fiber having a high spinning stability by using a purified solution of said polyacrylonitrile as a starting material; and a process for producing carbon fiber by carbonizing this acrylic fiber.

2. Description of the Related Art

Acrylic fibers have properties such as excellent bulking power, feeling and color definition like those of wool, and are utilized for various purposes The acrylic fiber is obtained as a product, i.e., staples or filaments, by subjecting a polyacrylonitrile as starting material to a step of its dissolution in an organic or inorganic solvent, and then spinning the resulting solution by a wet process, a dry process or a semi-dry semi-wet process. In general, the starting polyacrylonitrile is produced by radical polymerization of acrylonitrile monomer and a monomer copolymerizable therewith. The acrylic fiber obtained by the above method is carbonized into carbon fiber through a carbonizing step, and the carbon fiber has high performance characteristics such as high strength, modulus of elasticity and heat resistance and is utilized for various purposes, for example, it is used as a material for airplanes.

Suspension polymerization which is nonuniform polymerization in an aqueous system is a historied and widely used process for producing a polyacrylonitrile and is advantageos, for example, in that control of the quality of the polymer is easy, that recovery of an untreated monomer(s) is easy, and that the control of the whole process is easy. For the production of the polyacrylonitrile, a continuous suspension polymerization method using water as a medium for reaction is employed. As a polymerization initiator in this case, an inorganic initiator is generally used.

When monomers the greater part of which is acrylonitrile monomer are polymerized using an inorganic initiator (for example, an oxidation-reduction system of ammonium persulfate-ammonium hydrogensulfite-ferrous sulfate) and water acidified with sulfuric acid, as a medium for reaction, the resulting polyacrylonitrile forms particles, namely, the polyacrylonitrile is obtained in the form of an aqueous dispersion. The polyacrylonitrile usable as a material for acrylic fiber can be obtained by filtering the aqueous dispersion of the polymer after completion of the polymerization and washing and drying the precipitate. In this case, when an initiator containing iron is used, the resulting polyacrylonitrile contains iron compounds or iron ions.

For obtaining a polyacrylonitrile by continuous aqueous suspension polymerization, an aluminum reactor is absolutely necessary. This is because when a stainless reactor or a glass-lined reactor is used for producing a polyacrylonitrile by continuous aqueous suspension polymeization, the continuous polymerization becomes substantially difficult owing to the formation of a deposit of the polyacrylonitrile. It is said that when an aluminum reactor is used, its aluminum surface is corroded and dissolved because the reaction system is an acidic aqueous solution, whereby the formation of a deposit of the polyacrylonitrile is prevented.

For completing the polymerization reaction, a short-stop is used. The short-stop used for producing a polyacrylonitrile by aqueous suspension polymerization should have an ability to neutralize the acidic aqueous solution as reaction system. As the short-stop, there are used aqueous solutions of electrolytes such as sodium oxalate, ethylenediaminetetraacetic acid disodium salt, sodium hydrogencarbonate, etc.

Thus, a polyacrylonitrile is produced in the presence of at least electrolytes due to the polymerization initiator, electrolytes produced by the corrosion of a polymerizer, and the electrolytes added as short-stop. Moreover, with the progress of the polymerization reaction, the polyacrylonitrile forms polymer particles of several tens microns as dispersed particles in the aqueous system. Therefore, the polymer particles are contaminated with the above-mentioned various electrolytes such as iron compounds, aluminum compounds, etc.

In the production of an acrylic fiber from a polyacrylonitrile produced by such conventional aqueous suspension polymeization, the polymer obtained by the polymerization is subjected to a washing step and then a drying step, and dissolved in a solvent capable of dissolving the polyacrylonitrile, to obtain a polyacrylonitrile dope solution, which is spun by a wet process or a dry process to produce the acrylic fiber. Conventional polyacrylonitrile dope solutions, however, cause various problems in the production of recent high-quality acrylic fiber. For example, when the dope solution used for producing an acrylic fiber is held with heating (at about 100° C.) for a long period of time, its yellowing becomes marked, and the dope solution itself is gelatinized, so that the flowability of the solution is deteriorated. The yellowing of the dope solution causes yellowing of the acrylic fiber itself The gelatinization of the dope solution results in a low flowability of the solution, so that stable spinnable properties cannot be assured. Consequently, end breakage is caused and the production of acrylic fiber having a sufficiently high quality becomes difficult. In addition, the above-mentioned various electrolytes remain in carbon fiber obtained by firing the acry ic fiber and deteriorate the strength and the quality. Thus, the aforesaid various electrolytes, in particular, the iron compounds or ions thereof and the aluminum compounds and ions thereof, have an undesirable influence on the thermal stability of the polyacrylonitrile dope solution, the spinnable properties at the time of spinning into fiber, and physical properties of the fiber.

SUMMARY OF THE INVENTION

The present invention solves the problem which an aqueous suspension polymerization method involves when employed for producing acrylic fiber by the use of a polyacrylonitrile obtained by the aqueous suspension polymerization method as starting material or producing carbon fiber by carbonizing the acrylic fiber, namely, the problem that the electrolytes, i.e., impurities inavoidably mixed during the production of the polymer by the aqueous suspension polymerization method, remain in the polymer, so that the production of high-quality acrylic fiber is difficult. The present invention is intended to provide acrylic fiber having satisfactory spinnable properties and high-quality carbon fiber formed by carbonizing of the acrylic fiber, by removing completely the electrolytes in the acrylic fiber obtained by the aqueous suspension polymerization method, or reducing the electrolytes to a very small amount.

The present inventors found the following. The yellowing and gelatinization (which results in a low flowability) by long-term heating of a solvent solution of a polyacrylonitrile obtained by a continuous aqueous suspension polymerization method are caused by the above-mentioned various electrolytes, i.e., impurities remaining in the polyacrylonitrile. The electrolytes are not completely removed by conventional washing conducted after the polymerization. As described above, the continuous aqueous suspension polymerization into the polyacrylonitrile is conducted in the presence of the electrolytes due to the polymerization initiator, the electrolytes produced by the corrosion of a polymerizer and the electrolytes added as short-stop, and therefore also the inner parts of particles of the polyacrylonitrile, i.e., dispersed particles in an aqueous system, are contaminated with the various electrolytes.

Conventional water washing after the polymerization permits removal of the electrolytes on the surface of the polymer, but it is difficult to remove the electrolytes captured inside the polymer, by the washing. Particularly which there is employed an aqueous suspension polymerization method using an inorganic polymerization initiator, the end of a polyacrylonitrile obtained by the polymerization retains an ionized form, and the various electrolytes as impurities form counter ions for the ionized form and exist in the polymer. Therefore, the electrolytes are very difficult to remove by washing with water. The present inventors found that the electrolytes as impurities can be satisfactorily removed (namely, they can be removed completely or reduced to a very small amount) by making the polyacrylonitrile into a solution in an organic solvent and then purifying the same by the use of an ion exchange resin, whereby the present invention has been accomplished.

The present invention provides a method of purifying a polyacrylonitrile which comprises removing the iron compounds or ions thereof and the aluminum compounds or ions thereof which are contained as impurities in a polyacrylonitrile obtained by aqueous suspension polymerization using an inorganic redox initiator, from a solution consisting of the polyacryronitrile and an organic solvent capable of dissolving this polymer, by the use of a substance having ion-exchanging ability which is insoluble in said organic solvent; a process for producing acrylic fiber having satisfactory spinnable properties by spinning the solution obtained by the above purification method; and a process for producing high-quality carbon fiber by carbonizing said acrylic fiber.

When there is thus used the polyacrylonitrile having a very low content of the impurities, i.e., the iron compounds or ions thereof and the aluminum compounds or ions thereof, a dope solution used for producing the acrylic fiber is hardly yellowed or gelatinized even when held with heating (at about 100° C.). Moreover, in the production of an acrylic long fiber by wet spinning, end breakage is not caused by the condensation of the above-mentioned electrolytes as impurities dissolved in the dope solution of the polyacrylonitrile, on a guide in a spinning bath. Therefore, the productivity is improved. In addition, also in the carbon fiber obtained by carbonizing the acrylic fiber produced by the above process, there ar reduced fiber breakage, deterioration of strength characteristics and the like which are due to the influence of the aforesaid electrolytes.

A polyacrylonitrile obtained by aqueous suspension polymerization using an inorganic redox initiator can be made into a purified product containing none of or a very small amount of the electrolytes by the following high-degree washing. The polyacrylonitrile obtained by the polymerization is dissolved in an organic solvent capable of dissolving this polymer, to obtain a dope solution, and impurities such as the iron compounds or ions thereof and the aluminum compounds or ions thereof which ar contained in said polyacrylonitrile are removed using a substance having ion-exchanging ability which is insoluble in said organic solvent, such as an ion exchange resin or an ion exchange fiber.

The polyacrylonitrile solution according to the present invention is excellent in thermal stability and impurities-removing effect, and gives an acrylic fiber and a precursor fiber of carbon fiber which have a clearly slight color. Furthermore, the carbon fiber according to the present invention obtained from the precursor fiber have a high quality and high performance characteristics, permits further increase of the range of its use in the field of composite materials, and is thus of important industrial significance.

DESCRIPTION OF THE PREFERRED EMBODIMENTS

The present invention is intended for a polyacrylonitrile obtained by aqueous suspension polymerization using an inorganic redox initiator.

The inorganic redox initiator can be selected from conventional oxidizing agents and reducing agents. In the case of a redox initiator composed of a combination of an oxidizing agent and a reducing agent, typical examples of the oxidizing agent are conventional ones such as ammonium persulfate, potassium persulfate, sodium persulfate, etc. Typical examples of the reducing agent are conventional ones such as sodium sulfite, ammonium sulfite, sodium hydrogensulfite, ammonium hydrogensulfite, sodium thiosulfate, ammonium thiosulfate, sodium hydrosulfite, sodium formaldehydesulfoxylate, L-ascorbic acid, dextrose, etc. A compound such as ferrous sulfate or copper sulfate can also be used in combination with the oxidizing agents and the reducing agent. Of such combinations, a combination of ammonium persulfate-sodium (ammonium) hydrogensulfiteferrous sulfate is preferable. Although the ratio of the reducing agent to the oxidizing agent may be any ratio, the molar ratio of the reducing agent to the oxidizing agent is preferably 1 to 4 for carrying out the polymerization more efficiently.

The polyacrylonitrile used in the present invention may be a polymer comprising repeating units of acrylonitrile monomer and a monoolefin monomer copolymerizable therewith. In this case, the content of acrylonitrile monomer units in the polyacrylonitrile should be at least 60% by weight or more. This is because when the content of acrylonitrile monomer units is less than 60% by weight, acrylic fiber obtained from the polyacrylonitrile cannot have a fiber function which synthetic acrylic fibers naturally possess. The copolymerizable monoolefin monomer includes, for example, acrylic acid, methacrylic acid, their esters, acrylamide, vinyl acetate, styrene, vinyl chloride, vinylidene chloride, maleic anhydride, N-substituted maleimides, butadiene, and isoprene. As the copolymerizable monomer, there can also be used p-sulfonyl methallyl ether, methallylsulfonic acid, allylsulfonic acid, styrenesulfonic acid, 2-acrylamido-2-methylpropanesulfonic acid, 2-sulfoethyl methacrylate, and salts thereof.

The polymerization of acrylonitrile monomer is carried out in the following manner. The polymerization temperature is preferably 30°–80° C. When the polymerization temperature is higher than 80° C., acrylonitrile evaporates to disperse outside the reaction system, so that the polymerization conversion is lowered. When the polymerization teperature is lower than 30° C. The polymerization rate is decreased, resulting in not only a low productivity but also a low polymerization stability. As water used as a medium for polymerization, ion-exchanged water is preferably used. Although the ratio of ion-exchanged water to the monomer(s) (hereinafter referred to as water/monomer(s) ratio) may be any ratio, the water/monomer(s) ratio is preferably 1.0 to 5.0. The average residence time of the monomer(s) in a polymerizer may be a time conventionally employed for producing a polyacrylonitrile by an aqueous suspension polymerization method. The hydrogen ion concentration in the polymerizer may be any concentration so long as a catalyst causes oxidation-reduction reaction rapidly. It is preferably in an acidic region of pH 2.0 to 3.5.

The reaction is terminated by adding a shortstop to an aqueous polymer solution taken out of the polymerizer. As the short-stop, there may be used any short-stop usually used for producing a polyacrylonitrile by aqueous suspension polymerization. After the addition of the short-stop, the unreacted monomer(s) is recovered from the aqueous polymer solution. As a method for recovering the unreacted monomer(s), there are a method of distilling the aqueous polymer solution directly, and a method of separating the unreacted monomer(s) from the polymer by dehydration, followed by distillation. Either of these methods can be employed. As a dehydrating and washing machine used in the latter method, there is usually used a rotary vacuum filter which is a well-known filtering and dehydrating machine, a centrifugal dehydrator, or the like. In separating the polymer from the aqueous polymer solution by the us of such an apparatus, the following procedures may be carried out for conducting the separation more efficiently: addition of a flocculent such as ammonium sulfate, aluminum sulfate, sodium sulfate or the like; and heating of the aqueous polymer solution for acceleration of the aggregation of the polymer. The water remaining in the polymer is removed by a conventional drying method.

The polyacrylonitrile obtained in the manner described above is dissolved in an organic solvent. The organic solvent used in the present invention should be capable of dissolving said polyacrylonitrile. Of such solvents, dimethylformamide, dimethylacetamide and dimethyl sulfoxide are preferable. it is preferable to prepare a solution consisting of 5 to 35% by weight of said polyacrylonitrile obtained by aqueous suspension polymerization and 95 to 65% by weigh tof the above-mentioned organic solvent capable of dissolving said polyacrylonitrile. The reason why the proportion of the polyacrylonitrile is adjusted to 5 to 35% by weight is that employment of said solution for spinning is taken into consideration. When the proportion is less than 5% by weight, the concentration of the polymer is too low, so that satisfactory spinnable properties of acrylic fiber cannot be assured. When the proportion exceeds 35% by weight, the viscosity of the polymer solution becomes too high, so that the satisfactory spinnable properties cannot be assured.

As the substance having ion-exchanging ability and no solubility in the organic solvent which is used in the present invention, there can be exemplified crosslinked ion exchange resins and crosslinked ion exchange fibers. Of these, crosslinked ion exchange resins obtained from divinylbenzene and styrene are usually and preferably used. For making the polyacrylonitrile into a dope solution in the organic solvent and removing the impurities from the polymer by the use of a crosslinked ion exchange resin, it is necessary that the ion exchange resin should have affinity for the organic solvent and should be a crosslinked resin in order not to be dissolved in the organic solvent.

As such an ion exchange resin, there can be exemplified strong cation exchange resins having sulfonic acid groups as functional groups having ion-exchanging ability. When both a cation species and an anion species are exchanged by ion exchange for purifying the polyacrylonitrile, there are used a strong cation exchange resin having sulfonic acid groups and a strong anion exchange resin having quaternary amino groups. For capturing heavy metals, there can be used iminodiacetic acid type chelating agents and polyamine type chelating resins. There can also be used, for example, weak cation ion exchange resins obtained from methacrylic acid and acrylic acid, and weak anion exchange resins obtained by the use of a primary, secondary or tertiary amine. Both the weak cation exchange resin and the weak anion exchange resin can be used in combination. It is particularly preferable to use, of the above ion exchange resins, the strong cation exchange resin having sulfonic acid groups, or both the strong cation exchange resin having sulfonic acid groups and the strong anion exchange resin having quaternary amino groups.

The ion exchange resin(s) is used preferably in an amount of 0.01 to 1005 by weight based on the weight of the polyacrylonitrile solution. When the amount is less than 0.01% by weight, the ion-exchanging abilty is greatly decreased, so that such an amount is not practical. On the other hand, an amount of more than 100% by weight is not practical because it is economically disadvantageous and the recovery of the ion exchange resin(s) requires extra labor.

For purifying the polyacrylonitrile solution by the use of the ion exchange resin(s), either a tubular reactor or a tank-shaped reactor may be used. It is practical to carry out the purification by packing a tubular reactor with the ion exchange resin(s), feeding the polyacrylonitrile dope solution continuously to the reactor, ad allowing the solution to flow through the reactor. The purification of the polyacrylonitrile solution by the use of the ion exchange resin(s) is car ied out in a temperature range of 15 to 150° C. Below 15° C., the viscosity of the polyacrylonitrile solution is increased, resulting in a low flowability, and hence the progress of the ion exchange reaction becomes substantially difficult. Above 150° C., the ion exchange resin(s) used itself is insufficient in thermal stability and cannot be used for a long period of time in practice.

The concentrations of the impurities, i.e., the concentration of the iron compounds or ions thereof and the concentration of the aluminum compounds or ions thereof are reduced to 0 to 3 ppm and 0 to 10 ppm, respectively, by purifying the polyacrylonitrile solution by the use of the ion exchange resin(s) by the method of the present invention. It is preferable to reduce the concentration of the iron compounds or ions thereof and the concentration of the aluminum compounds or ions thereof to 0 to 1 ppm and 0 to 5 ppm, respectively.

When the concentration of the iron compounds or ions thereof or the concentration of the aluminum compounds or ions thereof exceeds 3 ppm or 10 ppm, respectively, the thermal stability of the polyacrylonitrile dope solution is deteriorated. The deterioration of thermal stability of the polyacrylonitrile dope solution has varius undesirable influences on the production process of an acrylic fiber, as described above, and has great undesirable influences on the qualities of the acrylic fiber and carbon fiber obtained from the acrylic fiber.

The polyacrylonitrile solution purified is shaped into acrylic fiber by the following spinning process.

Although the spinning process is not critical, the purified solution is spun by a conventional wet process or a conventional semi-dry semi-wet process to obtain a precursor. Specifically, solidified product obtained by discharging the purified solution into a solidifying medium by the wet process or the semi-dry semi-wet process is washed and drawn in a hot water bath by a conventional method, given process oil, and then densified by drying. If necessary, there may be employed a drawing means such as dry heat drawing or steam drawing.

The acrylic fiber is made into carbon fiber through the following carbonizing step.

The carbonizing step is not critical and a conventional method can be employed as it is. In detail, the precursor obtained by the above method is first pre-oxidized in an oxygen-containing gas at a temperature of 200°–400° C., and then carbonized at a temperature of at least 1,000° C. in an inert gas stream. If necessary, graphitization is carried out at a temperature of 3,000° C. or lower.

The present invention is concretely illustrated with the following examples, in which parts and percents are all by weight.

EXAMPLE 1

Into a polymerizer with a capacity of 11.6 m$^3$ equipped with a stirrer (reactor: an aluminum vessel, agitating blade: aluminum-coated turbine type) was charged 8 m$^3$ of ion-exchanged water (adjusted to pH 3). Acrylonitrile, vinyl acetate, ammonium persulfate, sodium hydrogensulfite, ferrous sulfate (FeSO$_4$.7H$_2$O) and sulfuric acid were dissolved in the ion-exchanged water to adjust their proportions to 91.4 parts, 8.6 parts, 0.4 parts, 1.3 parts, 0.00005 part and 0.085 part, respectively, and their supply was started immediately after the dissolution.

In addition, ion-exchanged water was separately supplied to adjust the total amount of ion-exchanged water to 200 parts. Polymerization reaction was carried out while maintaining the polymerization temperature at 55° C., stirring sufficiently, adjusting the average residence time of the starting materials to 90 minutes, and feeding the starting materials continuously. The polymer aqueous dispersion thus obtained was continuously taken out of the overflow outlet of the reactor, and an aqueous solution prepared as short-stop by dissolving 0.5 part of sodium oxalate, 1.5 parts of ammonium hydrogencarbonate and 0.5 part of ethylenediaminetetraacetic acid disodium salt in 100 parts of ion-exchanged water was added to the dispersion in a proportion of 0.2 part per 100 parts of the dispersion. In addition, ion-exchanged water was added, after which the unreacted monomers and the residues of the excess polymerization assistants were removed by washing by means of a rotary vacuum filter. The wet polymer thus obtained was formed into pellets with a screw extruder and dried with a through-flow dryer to obtain the polyacrylonitrile shown in Table 1.

In 75.7 parts of dimethylacetamide was dissolved 24.3 parts of the aforesaid dried polymer to obtain a polymer solution, and a strong ion exchange resin having sulfonic acid groups (DIAION PK228LH, mfd. by Mitsubishi Kasei Corp.) was added in an amount of 5 parts per 100 parts of the polymer. The resulting mixture was continuously stirred in a kneader at 80° C. while adjusting the average residence time to 30 minutes, and then filtered through a 100 mesh wire gauze to remove the ion exchange resin, whereby a polyacrylonitrile solution was obtained.

Wet spinning was conducted by pouring this polyacrylonitrile solution into a 55% aqueous dimethylformamide solution (40° C.) through a spinneret of 0.06 mm$\phi$ having 35,000 holes. Subsequently, the spinning product was washed and then drawn. A cationic-nonionic lubricant was given to the thus obtained acrylic fiber in an amount of 0.5% based on the weight of the fiber, and the thus treated fiber was dried, crimped, annealed, and then cut to obtain a acrylic fiber product of 3 denier. Characteristics of the acrylic fiber obtained are tabulated in Table 1.

EXAMPLE 2

Into a polymerizer with a capacity of 8.5 m$^3$ equipped with a stirrer (reactor: an aluminum vessel, agitating blade: aluminum-coated turbine type) was charged 5 m$^3$ of ion-exchanged water (adjusted to pH 3). Acrylonitrile, vinyl acetate, sodium methallylsulfonate, ammonium persulfate, sodium hydrogensulfite, ferrous sulfate (FeSO$_4$.7H$_2$O) and sulfuric acid were dissolved in the ion-exchanged water to adjust their proportions to 90.9 parts, 8.9 parts, 0.2 part, 0.5 part, 2.0 parts, 0.00005 part and 0.085 part, respectively, and their supply is started immediately after the dissolution. In addition, ion-exchanged water was separately supplied to adjust the total amount of ion-exchanged water to 250 parts. Polymerization reaction was carried out while maintaining the polymerization temperature at 55° C., stirring sufficiently, adjusting the average residence time of the starting materials to 90 minutes, and feeding the starting materials continuously. The aqueous polymer dispersion thus obtained was continuously taken out of the overflow outlet of the reactor, and an aqueous solution prepared as short-stop by dissolving 0.5 part of sodium oxalate, 1.5 parts of sodium hydrogencarbonate and 0.5 part of ethylene-diaminetetraacetic acid disodium salt in 100 parts of ion-exchanged water was added to the dispersion at a rate of 0.2 part. In addition, ion-exchanged water was added, after which the unreacted monomers and the residues of the excess polymerization assistants were removed by washing by means of a rotary vacuum filter. The wet polymer thus obtained was formed into pellets with a screw extruder and dried with a through-flow dryer to obtain the polyacrylonitrile shown in Table 1.

In 74 parts of dimethylacetamide was dissolved 26 parts of the aforesaid dried polymer to obtain a polymer solution, and a strong ion exchange resin having sulfonic acid groups (DIAION PK228LH, mfd. by Mitsubishi Kasei Corp.) was added in an amount of 5 parts per 100 parts of the polymer. The resulting mixture was continuously stirred in a kneader at 80° C. while adjusting the average residence time to 30 minutes, and filtered through a 100-mesh wire gauze to remove the ion exchange resin, whereby a polyacrylonitrile solution was obtained.

Semi-dry semi-wet spinning wa conducted by pouring this polyacrylonitrile solution into a 73% aqueous dimethylacetamide solution (40° C.) through a spinneret of 0.15 mm having 60 holes. Subsequently, the spinning product was washed and then drawn. An anionic-nonionic lubricant was given to the thus obtained acrylic fiber in an amount of 0.5% based on the weight of the fibr, and the thus treated fiber was dried, annealed, and then wound up to obtain an acrylic long fiber product of 3 denier. Characteristics of the acylic fiber obtained are tabulated in Table 1.

The acrylic long fiber obtained by the semi-dry semi-wet process hardly showed end breakage by spinning.

EXAMPLE 3

Into a polymerizer with a capacity of 8.5 m$^3$ equipped with a stirrer (reactor: an aluminum vessel, agitating blade: aluminum-coated turbine type) was charged ion-exchanged water (adjusted to pH 3). Acrylonitrile, methyl acrylate, sodium methallylsulfonate, ammonium persulfate, sodium hydrogensulfite, ferrous sulfate (FeSO$_4$.7H$_2$O) and sulfuric acid were dissolved in the ion-exchanged water to adjust their proportions to 94 parts, 5.5 parts, 0.5 part, 0.5 part, 2.0 parts, 0.00005 part and 0.07 part, and their supply was started immediately after the dissolution. In addition, ion-exchanged water was separately supplied to adjust the total amount of ion-exchanged water to 250 parts. Polymerization reaction was carried out while maintaining the polymerization temperature at 55° C., stirring sufficiently, adjusting the average residence time of the starting materials to 90 minutes, and feeding the starting materials continuously. The aqueous polymer dispersion thus obtained was continuously taken out of the overflow outlet of the reactor, and an aqueous solution prepared as short-stop by dissolving 0.5 part of sodium oxalate, 1.5 parts of sodium hydrogen-carbonate and 0.5 part of ethylenediaminetetraacetic acid disodium salt in 100 parts of ion-exchanged water was added to the dispersion at a rate of 0.2 part. In addition, ion-exchanged water was added, after which the unreacted monomers and the residues of the excess polymerization assistants were removed by washing by means of a rotary vacuum filter.

The wet polymer thus obtained was formed into pellets with a screw extruder and then dried with a through-flow dryer to obtain the polyacrylonitrile shown in Table 1.

In 70 parts of dimethylformamide was dissolved 30 parts of the aforesaid dried polymer to obtain a polymer solution, and a strong ion exchange resin having sulfonic acid groups (DIAION PK228LH, mfd. by Mitsubishi Kasei Corp.) was added in an amount of 5 parts per 100 parts of the polymer. The resulting mixture was continuously kneaded in a kneader while adjusting the average residence time to 30 minutes, and filtered through a 100-mesh wire gauze to remove the ion exchange resin, whereby a polyacrylonitrile solution was obtained.

Dry spinning was conducted by introducing this polyacrylonitrile solution into a spinning chimney containing a nitrogen gas atmosphere at 230° C., through a spinneret of 0.2 mm having 800 holes. Subsequently, the spinning product was washed and then drawn. An anionic-nonionic lubricant was given to the thus obtained acrylic fiber in an amount of 1.5% based on the weight of the fiber, and the thus treated fiber was dried, relaxed, crimped, and then cut to obtain acrylic fiber of 3 denier. Characteristics of the acrylic fiber obtained are tabulated in Table 1.

The acrylic fiber obtained by the dry process hardly showed end breakage by spinning.

EXAMPLE 4

Into a polymerizer with a capacity of 80 liters equipped with a stirrer (reactor: an aluminum vessel, agitating blade: aluminum-coated turbine type) was charged 35 liters of ion-exchanged water (adjusted to pH 3). Acrylonitrile, methacrylic acid, ammonium persulfate, ammonium hydrogensulfite, ferrous sulfate (FeS04 7H$_2$O) and sulfuric acid were dissolved in the ion-exchanged water to adjust their proportions to 98.0 parts, 2.0 parts, 1.5 parts, 4.5 parts, 0.00005 part and 0.085 part, respectively, and their supply was started immediately after the dissolution.

In addition, ion-exchanged water was separately supplied to adjust the total amount of ion-exchanged water to 400 parts. Polymerization reaction was carried out while maintaining the polymerization temperature at 60° C., stirring sufficiently, adjusting the average residnce time of the starting materials to 80 minutes, and feeding the starting materials continuously.

The aqueous polymer dispersion thus obtained was continuously taken out of the overflow outlet of the reactor, and an aqueous solution prepared by dissolving 0.5 part of ammonium oxalate and 1.5 parts of ammonium hydrogencarbonate in 100 parts of ion-exchanged water was added as a short-stop to the dispersion at a rate of 0.2 part. In addition, ion-exchanged water was added, after which the unreacted monomers and the residues of the excess polymerization assistants were removed by washing by means of a rotary vacuum filter. The wet polymer thus obtained was formed into pellets with a screw extruder and then dried with a through-flow dryer to obtain the polyacrylonitrile shown in Table 1.

In 78 parts of dimethylformamide was dissolved 22 parts of the dried polymer obtained in the above, and a strong ion exchange resin having sulfonic acid groups (DIAION HPK55H, mfd. by Mitsubishi Kasei Corp.) was added to the resulting polymer solution. The resulting mixture was mixed and kneaded in a kneader at 80° C. for 30 minutes and then filtered through a 100-mesh wire gauze to remove the ion exchange resin, whereby the polyacrylonitrile solution shown in Table 1 was obtained. The results of evaluating the thermal stability of the polyacrylonitrile solution are shown in Table 1.

Semi-dry semi-wet spinning was conducted by pouring this polyacrylonitrile solution into a 78% aqueous dimethylformamide solution (15° C.) through a spinnerer of 0.15 mm having 1,500 holes. Subsequently, the spinning product was washed and then drawn. An aminosiloxane type lubricant was given to the thus obtained precursor fiber in an amount of 1.0% based on the weight of the fiber. The fiber thus treated was dried to be densed, whereby a precursor of 1.0 denier was obtained.

By a conventional method, this precursor was continuously fed by roll drive to a furnace for imparting flame retardancy which contained an hot air atmosphere and had a temperature gradient ranging from 225 to 260° C., and the precursor was made flame-retardant while adjusting the residence time to 34 minutes. The flame-retardant fiber thus obtained was carbonized and fired in a carbonizing furnace containing a nitrogen gas atmosphere and having a temperature gradient ranging from 320 to 700° C. and a heat-treating furnace at 1,350° C. while adjusting the residence times in the former and latter furnaces to 7 minutes and 45 minutes, respectively. Thus, carbon fiber was obtained.

Characteristics of the carbon fiber obtained are tabulated in Table 1.

COMPARATIVE EXAMPLE 1

A polyacrylonitrile was obtained in exactly the same manner as in Example 1. In 70 parts of dimethylformamide was dissolved 30 parts of the above polymer to obtain a polymer solution, i.e., a solution of the polyacrylonitrile. Using the polymer solution, spinning was conducted in the same manner as in Example 1 without the ion exchange treatment described in Example 1, to obtain acrylic fiber. Characteristics of the acrylic fiber obtained are tabulated in Table 1.

This acrylic fiber obtained by the wet spinning showed end breakage by spinning and yellowing.

COMPARATIVE EXAMPLE 2

A polyacrylonitrile was obtained in exactly the same manner as in Example 1. In 74 parts of dimethylacetamide was dissolved 26 parts of the above polymer to obtain a polymer solution, i.e., a solution of the polyacrylonitrile. Using the polymer solution, spinning was conducted in the same manner as in Example 2 without the ion exchange treatment described in Example 2, to obtain acrylic fiber. Characteristics of the acrylic fiber obtained are tabulated in Table 1.

This acrylic fiber obtained by the semi-dry semi-wet spinning showed end breakage by spinning and yellowing.

COMPARATIVE EXAMPLE 3

A polyacrylonitrile was obtained in exactly the same manner as in Example 3. In 70 parts of dimethylformamide was dissolved 30 parts of the above polymer to obtain a polymer solution, i.e., a solution of the polyacrylonitrile. Using the polymer solution, spinning was conducted in the same manner as in Example 3 without the ion exchange treatment described in Example 3, to obtain acrylic fiber. Characteristics of the acrylic fiber obtained are tabulated in Table 1.

This acrylic fiber obtained by the dry spinning showed end breakage by spinning and yellowing.

COMPARATIVE EXAMPLE 4

A polyacrylonitrile was obtained in exactly the same manner as in Example 4. In 78 parts of dimethylformamide was dissolved 22 parts of the above polymer to obtain a polymer solution, i.e., a solution of the polyacrylonitrile. Using the polymer solution, spinning was conducted in the same manner as in Example 4 without the ion exchange treatment described in Example 4, to obtain a precursor. Characteristics of the precursor obtained are tabulated in Table 1. The precursor obtained by the above method showed end breakage by spinning and yellowing of fiber.

The precursor obtained was subjected to the same carbonizing treatment as in Example 4 to obtain carbon fiber. The results obtained are shown in Table 1. As compared with Example 4, the thermal stability of the dope was lower and the performance characteristics of the carbon fiber obtained were inferior and nonuniform.

TABLE 1

|  | Example 1 | Example 2 | Example 3 | Example 4 | Compar. Example 1 | Compar. Example 2 | Compar. Example 3 | Compar. Example 4 |
| --- | --- | --- | --- | --- | --- | --- | --- | --- |
| Polymer | | | | | | | | |
| Polymerization conversion (%) | 85.2 | 83.5 | 84.5 | 83.3 | 85.2 | 83.5 | 84.5 | 83.3 |
| Specific viscosity | 0.198 | 0.205 | 0.190 | 0.250 | 0.198 | 0.205 | 0.190 | 0.250 |
| Polymer composition % | | | | | | | | |
| AN component | 91.4 | 90.9 | 94.0 | 98.0 | 91.4 | 90.9 | 94.0 | 98.0 |
| Comonomer component AV | 8.6 | 8.9 | 5.5 | | 8.5 | 8.9 | 5.5 | |
| Comonomer component MA | | | | | | | | |
| Comonomer component MS | | 0.2 | 0.5 | | | 0.2 | 0.5 | |
| Comonomer component MAA | | | | 2.0 | | | | 2.0 |
| Impurity conc. | | | | | | | | |
| Aluminum (ppm) | 50 | 45 | 48 | 50 | 50 | 45 | 48 | 50 |
| Iron | 5 | 6.5 | 4.4 | 4.5 | 5 | 6.5 | 4.4 | 4.5 |
| Ammonium ion (ppm) | 58 | 39 | 28 | 75 | 58 | 39 | 28 | 75 |
| Sodium ion (ppm) | 450 | 520 | 550 | 0 | 450 | 520 | 550 | 0 |
| Polymer solution | | | | | | | | |
| Polymer dope solution | | | | | | | | |
| Just after: viscosity poise | 220 | ← | ← | ← | ← | ← | ← | ← |
| Just after: color tone | Yellowish | | | | | | | |
| Dope solution of a polymer purified with ion exchange resin | | | | | | | | |
| Just after: | 150 | 150 | 150 | 150 | — | — | — | — |

TABLE 1-continued

|  | Example 1 | Example 2 | Example 3 | Example 4 | Compar. Example 1 | Compar. Example 2 | Compar. Example 3 | Compar. Example 4 |
| --- | --- | --- | --- | --- | --- | --- | --- | --- |
| viscosity poise Just after: color tone | Yellow | Yellow | Yellow | Yellow |  |  |  |  |
| *Purified polyacrylonitrile* | | | | | | | | |
| Color tone of a purified polymer | White | White | White | White | — | — | — | — |
| *Impurity conc.* | | | | | | | | |
| Aluminum (ppm) | 3.5 | 3.0 | 2.6 | 3.5 | — | — | — | — |
| Iron | 0.2 | 0.3 | 0.6 | 0.3 | | | | |
| Ammonium ion (ppm) | 8 | 9 | 15 | 8 | | | | |
| Sodium ion (ppm) | 9 | 11 | 22 | 0 | | | | |
| Thermal stability (viscosity) (85° C. exposure test) | | | | | Solidified into a gel | Solidified into a gel | Solidified into a gel | Solidified into a gel |
| 6 Days: poise | 150 | 150 | 150 | 150 | | | | |
| 10 Days: poise | 170 | 170 | 170 | 170 | Reddish brown | Reddish brown | Reddish brown | Reddish brown |
| *Acrylic fiber* | | | | | | | | |
| Fiber: colored state | White | White | White | White | Light yellowish white | Light yellowish white | Light yellowish white | Light yellowish white |
| *Impurity conc.* | | | | | | | | |
| Aluminum (ppm) | 3.5 | 3.0 | 2.6 | 3.5 | 50 | 45 | 48 | 50 |
| Iron | 0.2 | 0.3 | 0.6 | 0.3 | 5 | 6.5 | 4.4 | 4.5 |
| Ammonium ion (ppm) | 8 | 9 | 15 | 8 | 58 | 39 | 28 | 75 |
| Sodium ion (ppm) | 9 | 11 | 22 | 0 | 450 | 520 | 550 | 0 |
| Degree of end breakage | 0.01 Time of end breakage per ton of the product | 0.5 Time of end breakage per ton of the product | 0.03 Time of end breakage per ton of the product | 0.1 Time of end breakage per ton of the product | 0.2 Time of end breakage per ton of the product | 7.3 Times of end breakage per ton of the product | 0.4 Time of end breakage per ton of the product | 3.5 Times of end breakage per ton of the product |
| *Carbon fiber* | | | | | | | | |
| *Impurity conc.* | | | | | | | | |
| Aluminum (ppm) | — | — | — | 3.5 | — | — | — | 50 |
| Iron | | | | 0.3 | | | | 4.5 |
| Ammonium ion (ppm) | | | | 8 | | | | 75 |
| Sodium ion (ppm) | | | | 0 | | | | 0 |
| Strand strength Kg/mm$^2$ | — | — | — | 580 | — | — | — | 460 |
| CV value (%) | | | | (7.2) | | | | (12.6) |
| Strand elastic t/mm$^2$ modulus | — | — | — | 27 | — | — | — | 26 |
| CV value (%) | | | | (1.9) | | | | (3.2) |

AN Acrylonitrile
AV Vinyl acetate
MA Methyl acrylate
MS Sodium methallylsulfonate
MAA Methacrylonitrile The measurement of the evaluation items in Table 1 are as follows.

Polymerization Conversion

An aqueous dispersion obtained by polymerization was collected, after which a polymer fraction was recovered from the dispersion by filtration, and the polymer yield was taken as polymerization conversion.

Specific Viscosity

In 100 ml of dimethylformamide was dissolved 0.5 g of a polymer, and the viscosity of the solution was measured at 25° C. (Ubbelohde viscometer).

Amount of Sodium Ions

Each of a polymer and fiber was subjected to combustion, and the amount of sodium ions was measured by the observation of the color of flame and the use of the ash obtained.

Amount of Ammonium Ions

Each of a polymer and fiber was heated in water to extract ammonium ions, and the amount of the ammonium ions was measured by a colorimetric method.

Amounts of Iron and Aluminum

Each of a polymer and fiber was subjected to combustion, and the amounts of iron and aluminum were measured by atomic absorption spectrometry by using the ash obtained.

Viscosity of a Polymer Solution

A time required for dropping of a ball in a dope having the polymer concentration described was measured on an oil bath at 85° C., whereby the viscosity of the solution was measured. The change of the viscosity with the lapse of time was measured in the same manner as above.

Color Tone of a Polymer Solution

A dope having the polymer concentration described was heated to 85° C. on an oil bath at 85° C., immediately after which the colored state of the dope was visually evaluated.

Composition of a Polymer

The composition of a polymer was determined by means of a proton NMR spectrometer. The symbol AN denotes acrylonitrile.

Degree of End Breakage

Spinning was conducted for 30 consecutive days by the use of a spinning machine, and the number of end breakages per ton of the product is shown. In each of Examples and Comparative Examples, the degree of end breakage was measured by the use of the sam spinning machine under the same spinning conditions.

Strand Strength

Measured according to the test method of the strength of a resin-impregnated strand prescribed in JIS-R7601. The number of measurements (n) is 10 and the average of ten measurements is shown in Table 1. Coefficients of variation of strand strength and strand

Elastic Modulus

Calculated by the following equations:

$$x = \frac{\sum_{i=1}^{n} x_i}{n-1} \tag{1}$$

$$s = \sqrt{\frac{\sum_{i=1}^{n} (x_i - \bar{x})^2}{n-1}} \tag{2}$$

$$CV = \frac{s}{\bar{x}} \times 100 \tag{3}$$

$\bar{x}$: average value
wherein
s: standard deviation,
CV: coefficient of variation (%),
$x_i$: each measured value,
n: numbre of measurements.

What is claimed is:

1. A method of purifying a polyacrylonitrile which comprises removing iron compounds or ions thereof and aluminum compounds or ions thereof which can be contained as impurities in a polyacrylonitrile obtained by aqueous suspension polymerization using an inorganic redox initiator, from a solution consisting of said polyacrylonitrile and an organic solvent capable of dissolving said polyacrylonitrile, by the use of a substance having ion-exchanging ability which is insoluble in said organic solvent.

2. A process for producing acrylic fiber which comprises
    removing iron compounds or ions thereof and aluminum compounds or ions thereof which can be contained as impurities in a polyacrylonitrile obtained by aqueous suspension polymerization using an inorganic redox initiator, from a solution consisting of said polyacrylonitrile and an organic solvent capable of dissolving said polyacrylonitrile, by the use of a substance having ion-exchanging ability which is insoluble in said organic solvent, and
    spinning the thus treated solution by a wet process, a semi-dry semi-wet process or a dry process.

3. A method according to claim 1, wherein the polyacrylonitrile is purified so as to reduce the concentration of the aluminum compounds and ions thereof in the polyacrylonitrile to 0 to 10 ppm.

4. A method according to claim 1, wherein the polyacrylonitrile is purified so as to reduce the concentration of the aluminum compounds and ions thereof in the polyacrylonitrile and the concentration of the iron compounds and ions thereof in the polyacrylonitrile to 0 to 10 ppm and 0 to 3 ppm, respectively.

* * * * *